Patented Nov. 3, 1953

2,657,988

UNITED STATES PATENT OFFICE 2,657,988

1[2-ALKYLSULFONYL) ETHYL] PYRIDINIUM HALIDES AND THEIR USE AS HERBICIDES

John K. Fincke, San Jose, Calif., assignor to Monsanto Chemical Company, St. Louis, Mo., a corporation of Delaware No Drawing. Application June 20, 1952, Serial No. 294,711

14 Claims. (Cl. 71—2.5)

The present invention relates to nitrogenous organic compounds of sulfur, provides certain new (alkylsulfonyl) ethyl-substituted heterocyclic quaternary nitrogen compounds, herbicidal or defoliant compositions containing the new compounds, and methods of destroying undesirable plants or removing leaves therefrom in which methods the present compositions are employed.

The invention provides as new and valuable compositions a series of 2-(alkylsulfonyl) ethyl substituted-quaternary nitrogen compounds having the general formula

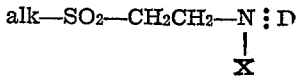

in which alk represents an alkyl radical of from 8 to 20 carbon atoms, X is selected from the class consisting of chlorine and bromine, and N⋮D represents a compound of the pyridine series consisting of pyridine, quinoline, isoquinoline, C-linked chlorine derivatives thereof containing from 1 to 2 chlorine substituents, and C-linked alkyl homologues thereof containing from 1 to 3 C-alkyl substituents, the number of carbon atoms in each of said C-alkyl substituents being from 1 to 2.

The above general formula includes, e. g., 1-[2-(alkylsulfonyl) ethyl]pyridinium chlorides or bromides, 1-[2-(alkylsulfonyl) ethyl]quinolinium chlorides or bromides, 1-[2-(alkylsulfonyl) ethyl]isoquinolinium chlorides or bromides, 1-[2-(alkylsulfonyl) ethyl]-α-picolinium chlorides or bromides, 1-[2-(alkylsulfonyl) ethyl]lepidinium chlorides or bromides, 1-[2-(alkylsulfonyl) ethyl]-2-methyl-5-ethylpyridinium chlorides or bromides, 1-[2-(alkylsulfonyl) ethyl]α,γ-lutidinium chlorides or bromides, 1-[2-(alkylsulfonyl)-ethyl]-α,β, or γ-collidinium chlorides or bromides, 1 - [2 - (alkylsulfonyl) ethyl]α - chloropyridinium chlorides or bromides, and 1-[2-(alkylsulfonyl)-ethyl]-α,β-dichloroquinolinium chlorides or bromides in which the alkyl radical has from 8 to 20 carbon atoms.

Compounds having the above formula are readily obtainable by heating a mixture of the pyridine compound and the appropriate 2-(alkylsulfonyl) ethyl halide in the presence or absence of an inert diluent until the quaternary nitrogen compound has been formed. Temperatures of from, say, 50° C. to the refluxing temperature of the reaction mixture may be used. Generally, completion of the reaction may be evidenced by noting a change in the water-solubility of the reaction mixture, the quaternary products being highly water-soluble and the starting materials being generally water-insoluble. Since formation of the quaternary compounds involves addition of one mole of the halide to one mole of the pyridine compound, substantially equimolar proportions of these reactants are advantageously employed. However, an excess of either reactant may be used. An excess of the pyridine compound may be employed as a diluent in the reaction. Other diluents which may be used are liquids which are inert under the reactions conditions, e. g., alcohol, acetone, ether, nitrobenzene, etc.

2-(alkylsulfonyl) ethyl halides which may be used for the preparation of the present quaternary compounds are primary or branched-chain 2-(alkylsulfonyl) ethyl chlorides or bromides of from 10 to 22 carbon atoms, e. g., 2-(n-octylsulfonyl) ethyl chloride, 2-[(2-ethylhexyl) sulfonyl]-ethyl bromide, 2-(n-nonylsulfonyl) ethyl chloride, 2-(n-decylsulfonyl) ethyl chloride, 2-(n-hendecylsulfonyl) ethyl bromide, 2-(n-dodecylsulfonyl) ethyl chloride, 2-(tert-dodecylsulfonyl) ethyl bromide, 2-(n-hexadecylsulfonyl) ethyl bromide, 2-(n-octadecylsulfonyl) ethyl chloride, 2-(eicosylsulfonyl) ethyl chloride, etc. The alkyl radical of the 2-(alkylmercapto) ethyl halide may also be one which is derived from technical mixtures of higher alcohols obtained by reaction of carbon monoxide with hydrogen.

Compounds of the pyridine series which may be reacted with the 2-(alkylsulfonyl) ethyl chlorides or bromides to give the present quaternary compounds include pyridine, quinoline, isoquinoline, the picolines, the collidines, the lutidines, the lepidines, and derivatives thereof in which from one to two of the C-hydrogens are substituted by chlorine.

The present quaternary nitrogen compounds are generally water-soluble, stable compounds which range from viscous liquids to waxy or crystallizing solids. They are very valuable in the formation of efficient herbicidal compositions, as will be hereinafter disclosed, but they may also be used for a variety of other industrial and agricultural purposes, e. g., as lubricant additives, surface-active agents, chemical intermediates, etc. They are particularly useful as the active ingredients in compositions for defoliating plants prior to harvesting of non-leafy crops. Defoliating compositions containing the 1-(2-alkylsulfonyl-ethyl) pyridinium chlorides are especially valuable when used on such annual plants as cotton, soy beans, peas, etc. Application of the present defoliants to such plants results in leafdrop and thus permits more efficient machine-harvesting or hand-picking of the bolls or pods.

The invention is further illustrated, but not limited, by the following examples.

Example 1

Pyridine (4.02 g.) and 2-(n-dodecylsulfonyl)-ethyl chloride (14.8 g.) were dissolved in absolute ethanol and refluxed for 3 hours. The alcohol was then removed by vacuum distillation, and 20 additional grams of pyridine were added to the residue. The resulting mixture was refluxed for 1.5 hours, at which time a test sample was completely water-soluble. At this point the reaction mixture was cooled and a large excess of anhydrous ether was added to it in order to precipitate the quaternary compound. The crystalline precipitate was filtered off, and vacuum-dried for several days at 40° C. There was thus obtained a 73 per cent yield of the substantially pure 1-[2-(n-dodecylsulfonyl)ethyl]pyridinium chloride, analyzing 9.88 per cent ionic chloride (calcd. ionic Cl for $C_{19}H_{34}SO_2NCl$, 9.0%).

Example 2

Dry pyridine (16.0 g., 0.2 mole), and 2-(n-decylsulfonyl)-ethyl chloride (20.0 g., 0.074 mole) dissolved in 150 cc. of absolute ethanol were refluxed for 18 hours. The alcohol was removed by distillation in vacuo and the quaternary salt precipitated by adding 200 cc. of ether to the residue. The crude solid thus obtained was recrystallized from dry acetone. The recrystallized and dried product was the substantially pure 1-[2-(n-decylsulfonyl)ethyl]pyridinium chloride, analyzing 9.54 per cent ionic chlorine (calcd. Cl for $C_{17}H_{30}SO_2NCl$, 10.2%).

Example 3

A mixture consisting of 15.0 g. of n-octadecylsulfonylethyl chloride and 16.0 g. of dry pyridine was refluxed in 150 cc. of absolute alcohol for 18 hours. The alcohol was then removed from the reaction by vacuum distillation and the residue was treated with dry ether. The resulting precipitate was filtered and recrystallized from acetone containing 5 per cent of absolute alcohol. There was thus obtained 13.2 g. of substantially pure 1-[2-n-octadecylsulfonyl)ethyl]-pyridinium chloride.

Example 4

Spray testing of the herbicidal activity of the compounds of Examples 2 and 3 was conducted as follows.

One per cent aqueous solutions of the quaternary compounds were prepared, employing 0.2 per cent of an emulsifying agent known to the trade as "Emulsifier L" and comprising a mixture of a polyethyleneglycol derivative and an alkylbenzenesulfonate.

Three-week old corn and bean plants were respectively sprayed with the solutions, two plants of each variety being used for each test. The spraying was continued until droplets formed and/or fell from the foliage and stems of the sprayed plants, up to 15 ml. of the solution or suspension being applied to each plant. The sprayed plants as well as two untreated "blank" specimens of each plant were then allowed to remain in the same greenhouse for a period of one week. At the end of that time the sprayed plants were compared with the untreated plants in order to determine the extent of injury, if any. The following observations were made:

| Compound Tested | Extent of Injury | |
|---|---|---|
| | Bean | Corn |
| 1-[2-(n-Octadecylsulfonyl)ethyl] pyridinium chloride (Example 3) | Severe, leaves all dropped. | Severe, leaves dried. |
| 1-[2-(n-Decylsulfonyl)ethyl] pyridinium chloride (Example 2) | Severe | Slight. |

This application is a continuation-in-part of my co-pending application Serial No. 250,816, filed October 10, 1951.

What I claim is:

1. Quaternary nitrogen compounds having the formula:

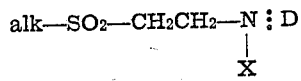

in which alk represents an alkyl radical of from 8 to 20 carbon atoms, X is selected from the class consisting of chlorine and bromine and N : D represents a heterocyclic compound of the pyridine series consisting of pyridine, quinoline, isoquinoline, C-linked chlorine derivatives thereof containing from 1 to 2 chlorine substituents and C-linked alkyl homologues thereof containing from 1 to 3 C-alkyl substituents, the number of carbon atoms in each of said C-alkyl substituents being from 1 to 2.

2. 1-[2-(alkylsulfonyl)ethyl]pyridinium chlorides in which the alkyl radical has from 8 to 20 carbon atoms.

3. 1-[2-(n-decylsulfonyl)ethyl]pyridinium chloride.

4. 1-[2-(n-dodecylsulfonyl)ethyl]pyridinium chloride.

5. 1-[2-(n-octadecylsulfonyl)ethyl]pyridinium chloride.

6. The method which comprises heating a halide selected from the class consisting of 2-(alkylsulfonyl)ethyl chlorides and 2-(alkylsulfonyl)ethyl bromides in which each alkyl radical has from 8 to 20 carbon atoms with a compound of the pyridine series selected from the class consisting of pyridine, quinoline, isoquinoline, C-linked chloride derivatives thereof and C-linked alkyl homologues thereof containing from 1 to 3 C-alkyl substituents, the number of carbon atoms in each of said C-alkyl substituents being from 1 to 2, and recovering from the resulting reaction product a quaternary nitrogen compound having the formula:

in which alk represents an alkyl radical of from 8 to 20 carbon atoms, X is selected from the class consisting of chlorine and bromine and N D represents a heterocyclic compound of the pyridine series consisting of pyridine, quinoline, isoquinoline, C-linked chloride derivatives thereof containing from 1 to 2 chlorine substituents and C-linked alkyl homologues thereof containing from 1 to 3 C-alkyl substituents, the number of carbon atoms in each of said C-alkyl substituents being from 1 to 2.

7. The method which comprises heating pyridine with a 2-(alkylsulfonyl)ethyl chloride in which the alkyl radical has from 8 to 20 carbon atoms, and recovering from the resulting reaction product a 1-[2-(alkylsulfonyl)ethyl]-pyridinium chloride in which the alkyl radical has from 8 to 20 carbon atoms.

8. The method which comprises refluxing 2-

(n-decylsulfonyl)ethyl chloride with pyridine and recovering 1-[2-(n-decylsulfonyl)ethyl]-pyridinium chloride from the resulting reaction mixture.

9. The method which comprises refluxing 2-(n-dodecylsulfonyl)ethyl chloride with pyridine and recovering 1-[2-(n-dodecylsulfonyl)ethyl]-pyridinium chloride from the resulting reaction product.

10. The method which comprises refluxing 2-(n-octadecylsulfonyl)ethyl chloride with pyridine and recovering 1-[2-(n-octadecylsulfonyl)-ethyl]pyridinium chloride from the resulting reaction product.

11. A herbicidal composition comprising an inert carrier and, in a quantity which is injurious to plant life, a quaternary nitrogen compound having the formula

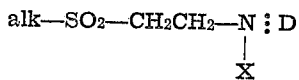

in which alk represents an alkyl radical of from 8 to 20 carbon atoms, X is selected from the class consisting of chlorine and bromine and N : D represents a heterocyclic compound of the pyridine series consisting of pyridine, quinoline, isoquinoline, C-linked chlorine derivatives thereof containing from 1 to 2 chlorine substituents, and C-linked alkyl homologues thereof containing from 1 to 3 C-alkyl substituents, the number of carbon atoms in each of said C-alkyl substituents being from 1 to 2.

12. A herbicidal composition comprising an aqueous solution of 1-[2-(n-octadecylsulfonyl)-ethyl]pyridinium chloride, said chloride being present in a quantity which is injurious to plant life.

13. The method of destroying undesirable plants which comprises applying to said plants a harmful quantity of a herbicidal composition comprising an inert carrier and, as the essential active ingredient, a quaternary nitrogen compound having the formula

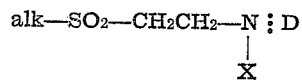

in which alk represents an alkyl radical of from 8 to 20 carbon atoms, X is selected from the class consisting of chlorine and bromine and N : D represents a heterocyclic compound of the pyridine series consisting of pyridine, quinoline, isoquinoline, C-linked chlorine derivatives thereof containing from 1 to 2 chlorine substituents, and C-linked alkyl homologues thereof containing from 1 to 3 C-alkyl substituents, the number of carbon atoms in each of said C-alkyl substituents being from 1 to 2.

14. The method of destroying undesirable plants which comprises applying to said plants a harmful quantity of a herbicidal composition comprising 1-[2-(n-octadecylsulfonyl)-ethyl]-pyridinium chloride as the essential active ingredient.

JOHN K. FINCKE.

No references cited.